United States Patent [19]

Perez

[11] Patent Number: 5,669,591
[45] Date of Patent: Sep. 23, 1997

[54] FASTENING SYSTEM FOR AUTO ANTITHEFT DEVICE

[76] Inventor: Joseph P. Perez, 1216 "A" St., Apt. B, Coerur d'Alene, Id. 83814

[21] Appl. No.: 630,969
[22] Filed: Apr. 8, 1996
[51] Int. Cl.$^6$ .................................. F16M 11/00
[52] U.S. Cl. .............. 248/201; 224/901.6; 248/74.1; 248/205.2; 248/690
[58] Field of Search ................ 248/74.1, 74.2, 248/201, 205.2, 229.17, 690, 74.3; 224/901.6, 913, 915, 567, 568, 570

[56] References Cited

U.S. PATENT DOCUMENTS

| | | | |
|---|---|---|---|
| D. 344,967 | 3/1994 | Webster | 248/205.2 X |
| 3,061,253 | 10/1962 | Keaton | 248/74.1 |
| 3,110,465 | 11/1963 | Sugarman et al. | 248/74.3 |
| 4,417,710 | 11/1983 | Adair | 248/205.2 X |
| 4,779,831 | 10/1988 | Anderson | 248/311.2 |
| 4,934,522 | 6/1990 | Nelson | 206/44 |
| 4,984,725 | 1/1991 | Urbom | 244/311 |
| 5,127,715 | 7/1992 | Doyle et al. | 311/9.46 |
| 5,169,105 | 12/1992 | Yasukawa | 248/205.2 |
| 5,242,063 | 9/1993 | Ericksen et al. | 211/87 |
| 5,350,094 | 9/1994 | Morford | 224/568 X |
| 5,366,070 | 11/1994 | Wolov | 206/214 |
| 5,531,368 | 7/1996 | Morford | 224/568 X |
| 5,615,815 | 4/1997 | Hogan | 248/309.1 X |

*Primary Examiner*—Ramon O. Ramirez
*Assistant Examiner*—Stephen S. Wentsler
*Attorney, Agent, or Firm*—Keith S. Bergman

[57] ABSTRACT

A holder is disclosed for use in pairs to releasably fasten an elongate body of an auto antitheft device to a supporting automotive surface for storage during periods of non-use. The holder provides a rigid elongate base defining plural spaced holes to receive screw fasteners to attach the base to an interior surface of an automobile body. The base carries one element of a fabric hook and loop type fastener on its outer surface. An elongate flexible fastening band is fastened to one end of the base to extend over the outer surface of the base. The fastening band carries on its inner surface a second mating fabric hook and loop type fastener element to releasably engage the first element carried on the base. The fastening band defines an outwardly extending portion adjacent the end fastened to the body to receive and positionally maintain a portion of the body of an auto antitheft device between the fastening band and body and defines a tab extending beyond the body at its unfastened end to aid manipulation. Optionally a fabric hook and loop type fastener may be positioned on the body of the auto antitheft device at the area of contact with the fastening band to provide more secure attachment of the body in my holder.

4 Claims, 1 Drawing Sheet

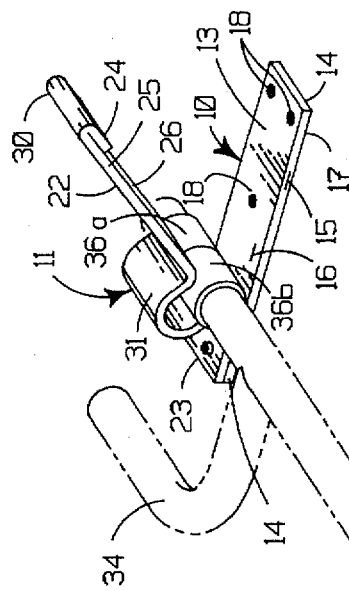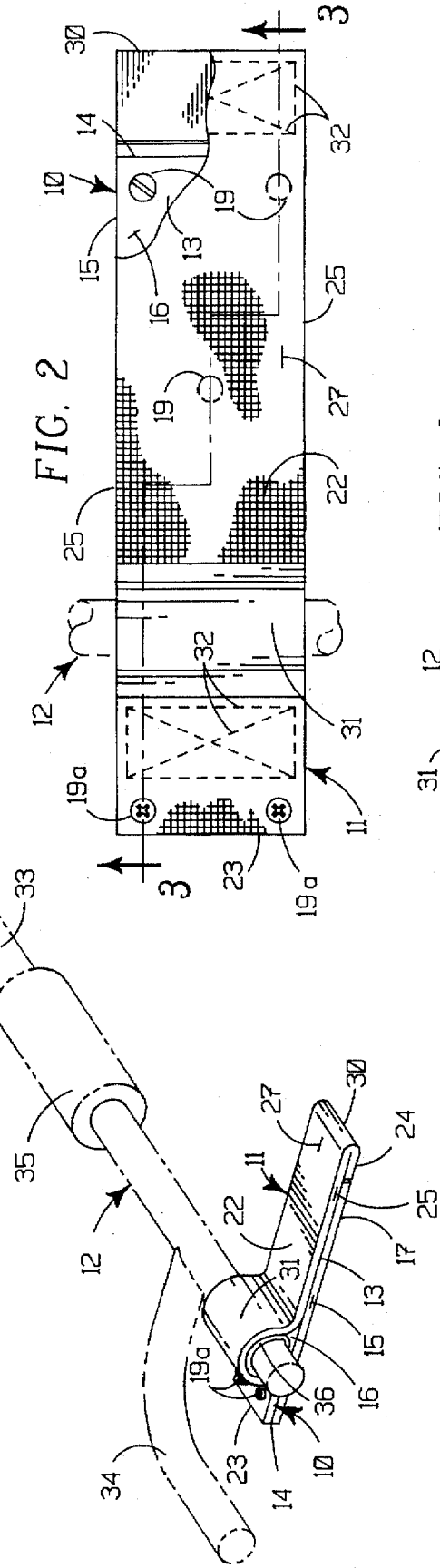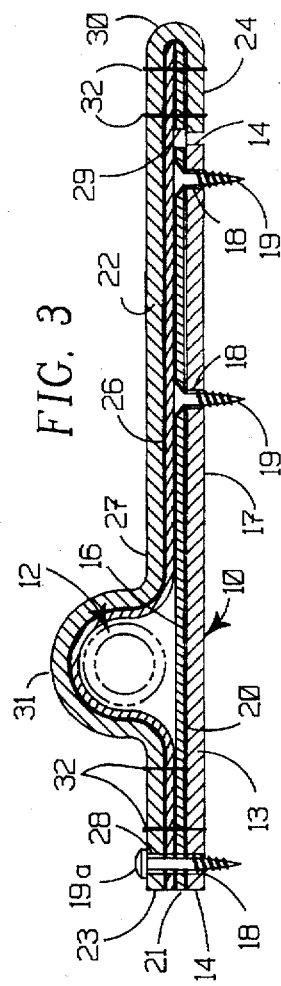

FASTENING SYSTEM FOR AUTO ANTITHEFT DEVICE

II. BACKGROUND OF INVENTION

IIA. Related Applications

There are no applications related hereto heretofore filed in this or any foreign country.

IIB. Field of Invention

This invention relates generally to supports, and more particularly to a pair of holders attached in spaced relationship to the inner surface of a vehicle to releasably support the elongate body of an auto antitheft device.

IIC. Background and Description of Prior Art

Automotive vehicles are a prized part of modern culture and, by reason of their configurational nature and mobility, have been and increasingly are becoming an object of thievery. Responsively various devices have become known to prevent or make more difficult the theft of unattended vehicles. One type of such device of present day popularity provides an elongate rod-like body having two radially extending coplanar hook-like elements opening outwardly toward the ends of the body, with locking means for adjustment of the length of the body between the hooks to allow positioning of the device in a locked fashion on the steering wheel of a vehicle to either prevent operation of the steering wheel, or at least make more difficult the operation and indicate the theft of a vehicle having a steering wheel encumbered by the device. Such antitheft devices are used only during periods of non-use of a vehicle which they protect and when the device is not in use, it presents a storage problem.

Such antitheft devices, necessarily to fulfill their purposes, must be formed of durable material that cannot easily be broken, or otherwise severed. This requirement generally requires formation from metal or a composit metal structure which results in an object of substantial mass, size, and rigidity. The interior structure and finish of ordinary automotive vehicles, however, are not designed to accommodate such a device and in general, there is no convenient place to store it during periods of non-use. Generally such antitheft devices have merely been left loose in a vehicle to be supported only against gravity on a vehicle floor, shelf or seat surface and without any fastenable interconnection to any part of the vehicle structure. Less often such devices may be stored in a vehicle trunk or other storage compartment, but this is not so common because it is more difficult to access the device for either storage or use from such a compartment, which usually may be accessed only from the exterior of a vehicle and not by a user seated within the vehicle.

By reason of the mass and physical configuration of antitheft devices and the lack of readily available storage facilities for them during non-use periods, they present a substantial storage problem that may not only be an anesthetic nuisance but also a physical endangerment for vehicle occupants. Because of their substantial mass antitheft devices tend to have substantial momentum, which during normal use of a vehicle as speeds change tends to create motion of the devices relative to the vehicle and within a vehicle compartment where the device is stored. This motion under appropriate circumstances may be sufficiently violent to cause an antitheft device to move through the air and impact upon various vehicle surfaces or upon persons in a vehicle passenger compartment which can result in substantial damage or injury.

Additionally in normal vehicle operation smaller motions of the device may be caused by lesser momentum forces resulting from the operation of shocks on a vehicle or other motion of the vehicle relative to a supporting roadway. This lesser type of momentum change may cause aesthetically displeasing noise or may be sufficient to cause wear or other physical deterioration to various automotive parts which come into contact with the antitheft device, especially if it be positionally maintained over periods of time in the same portion of a vehicle. These problems tend to persist whether the antitheft device be stored in the vehicle passenger compartment or in a storage chamber such as the trunk of an automobile. In the case of some open storage compartments such as the back of a pickup truck, a box therein or the like, the device may even be lost from its containing chamber by reason of motion generated momentum caused by the vehicle motion.

My system seeks to solve these problems by providing similar cooperating holders carried in spaced adjacency on the interior surface of a vehicle to releasably fasten and positionally maintain spaced portions of the body of an antitheft device in a safe and desirable storage position on the vehicle surface during periods of non-use.

My holders are of relatively small size compared to the overall dimension of an antitheft device to be held and are used in spaced relationship to aid accommodation of any configurational differences or irregularities in a vehicle surface on which the device is fastened or in the device itself. My spaced holders allow the positioning of an antitheft device in positions on and areas of a vehicle surface that would not be possible or suitable for such purpose if a single holder is used or if the holder were interconnected by a rigid elongate body. Additionally the fastening of the antitheft device near each end portion of the body tends to better maintain the device than were it fastened in one medial position or two positions closer together, as probabilistically the torquing or moving forces are better controlled. Such smaller spaced holders distinguish my system from prior single holder structures that have medial fastening devices and elongate structures that have spaced fastening devices that are interconnected by rigid body elements.

My holder provides a flexible fastening band with a pre-formed portion near its end that is fastened to the holder body to conformably receive the body of an antitheft device to be fastened thereby. This provides more secure fastening firstly, in that the band may extend quite tightly about the body portion of the device to be fastened to more securely maintain the fastened mode and secondly to provide a portion of the band that is fastened by fabric fasteners that has a greater length and area than if the antitheft device were fastened in a more medial portion of the band. The fastening of the antitheft device body by a flexible fastening band allows adjustment of the band to accommodate antitheft devices with various body sizes with appropriate deformation of the pre-formed area to still well fit about the body portion to maintain more secure fastening. The fastening band preferably is formed of a woven polymeric fiber material that may be set sufficiently by thermal, chemical or mechanical means to create sufficient memory in the fiber to configurationally maintain the pre-formed area to some degree, but yet allow deformation to accomplish its purpose in distinguishment from prior band type fastening devices.

My fastening system optionally may provide for each holder a strip of hook and loop fabric fastener that is fastened about the periphery of the body portion of an antitheft device which is fastened by the holder to provide more secure fastening. Since such a band will contact both elements of the fabric fastener of the holder, it preferably is formed by two adjacent bands of both elements of a fabric fastener so that it will fasten to both elements of the fabric fastener of the holder.

The smaller size and spaced nature of my holders coupled with the flexible strap fastener that is adjustably fastened by hook and loop type fabric fasteners allows use of my holders with most, if not all, of the various club-type antitheft devices of present day commerce and allows mounting of those devices on almost any interior surface of an automotive vehicle where the devices may be positioned.

My invention lies not any one of these features individually, but rather in the synergistic combination of all of its structures that necessarily give rise to the functions flowing therefrom as herein specified and claimed.

III. SUMMARY OF INVENTION

My invention provides two similar holders carried in spaced relationship on an inner surface of an automotive vehicle to releasably fasten about and positionally maintain the end portions of an elongate rod-like body of an antitheft device. Each holder has an elongate base defining plural holes for fastening the base on an automotive surface. The outer surface of the base carries one element of a hook and loop fabric fastener and a flexible fastening band fastened at one end portion to extend over the base. The fastening band carries a second mating element of the hook and loop fabric fastener to cooperate with the first element to fasten a portion of the body of an antitheft device between the fastening band and base. The unfastened outer end portion of the fastening band is folded upon itself to provide a tab projecting beyond the base to aid manipulation. Two cooperating holders are positioned on a vehicle surface so that they engage each outer end portion of the body of an antitheft device, immediately outwardly of its hooked portions, so that the body may not move sufficiently in an axial direction to become disengaged from the holders carrying it.

In providing such a fastening system, it is:

A principal object to provide two relatively small holders that may be positioned in spaced relationship on the interior surface of a vehicle to releasably hold the end portions of the elongate body of an auto antitheft device and releasably maintain that device for storage during periods of non-use.

A further object is to provide such holders that are used in unconnected pairs so that they may be positioned at appropriately spaced distance in various positions on inner curvilinear and irregular surfaces of a vehicle where a single larger fastening device with similar span may not be positionable.

A further object is to provide such holders that have a base carrying a flexible fastening band that may be pre-shaped to extend over and receive the body of an antitheft device but yet allow flexible deformation to accept bodies of varying cross-sectional configuration and size while yet providing secure fastening for such bodies.

A still further object is to provide such a flexible fastening band that is fastened to the associated base by hook and loop type fabric fastening elements to allow continuous adjustability in fastening but yet provide a secure fastening that is not disrupted by the inertial forces created in a fastened antitheft device by motion of a vehicle in which it is carried.

A still further object is to provide such system and holders that are of new and novel design, of rugged and durable nature, of simple and economic manufacture and otherwise well adapted for the uses and purposes for which they are intended.

Other and further objects of my invention will appear from the following specification and accompanying drawings which form a part hereof. In carrying out its objects, however, it is to be remembered that its accidental features are susceptible of change in design and structural arrangement with only one preferred and practical embodiment of the best known mode being illustrated in the accompanying drawings and specified as is required.

IV. BRIEF DESCRIPTION OF DRAWINGS

In the accompanying drawings which form a part hereof and wherein like numbers of reference refer to similar parts throughout:

FIG. 1 is an isometric surface view of two of my holders carrying an antitheft prevention device illustrated in dashed outline to show their various parts, their configuration and relationship, as well as their use.

FIG. 2 is a somewhat enlarged, partially cut-away orthographic top view of the lower left holder of FIG. 1.

FIG. 3 is a medial vertically cross-sectional view of the holder of FIG. 2, taken on the broken line 3—3 thereon in the direction indicated by the arrows.

V. DESCRIPTION OF PREFERRED EMBODIMENT

My holders generally provide base 10 carrying fastening band 11 to fit over antitheft prevention device 12 to positionally maintain that device during periods of non-use.

Base 10 provides relatively thin elongate body 13, in the instance illustrated of rectilinear configuration, with similar ends 14 and sides 15 joining outer face 16 and inner face 17. The body defines a plurality of fastening holes 18 extending therethrough between inner face 17 and outer face 16 to accept fasteners 19, in the instance illustrated comprising headed metal screws. The outer face 16 of the body carries one element 20 of a hook and pile type fabric fastener extending over all or a substantial portion of that outer face. The fabric fastener element 20 is fastened to the adjacent outer face 16 of the body preferably by adhesion, and it defines plural fastener holes 21 arrayed in coincidence with fastening holes 18 defined in the body where the body and fastening band are in permanently fastened position adjacent each other.

Body 13 is formed from a reasonably strong durable material that may vary in flexibility from substantial pliability to substantial rigidity for different purposes and uses. Normally if the body is to be attached to a reasonably flat surface of a vehicle, it preferably is more rigid and formed of metal or one of the harder, more dense polymeric or resinous plastics, though in some instances, especially where the body is to be carried on a curvilinear surface having a substantial curvature gradient, it may be more securely maintained on such vehicle surface if it be of a more pliant nature so that it may somewhat conform to the contour of the surface on which it is carried. Depending on the nature of the material, and especially if the material is particularly flexible, it may be desirable to line the fastening holes 18, 21 with harder, more rigid grommets (not shown) to prevent enlargement or tearing of those fastening holes by motion of the base relative to a supporting automotive surface. Washers (not shown) also may be used for the same purpose as is well known in the fastening arts.

The configuration and dimensioning of the body are not critical to my invention and either parameter may vary substantially while remaining within its spirit and scope of my invention. In general, I prefer a body having a length of approximately six inches and width of approximately two inches to provide appropriate support to serve its purpose while yet maintaining a reasonably small configuration so as not to be aesthetically intrusive or prevent fastening on normal curvilinear interior vehicle surfaces.

Fastening band 11 provides elongate strap 22, in the instance illustrated of a rectilinear peripheral and cross-sectional configuration with a width substantially the same as the width of the body 13 and a length somewhat greater. The strap is defined by fastened end 23, unfastened end 24 and similar sides 25 joining inner face 26 and outer face 27. The fastened end 23 of the strap defines fastening holes 28 so arrayed as to be coincident with fastening holes defined in the body 13 that are beneath the fastened portion of the strap so that headed fasteners 19a may pass therethrough. The inner face 26 of strap 22 carries an interconnected second element 29 of a fabric fastener that cooperates with the fabric fastener element 20 to form a releasably fastenable joinder when the adjacent surfaces of the two fabric fasteners are in contact. The fastening of this second fabric fastener element 29 to the strap may be accomplished by adhesion, sewing or other similar known means. The unfastened end portion 24 of the strap that extends beyond body 13 is folded back upon itself with the two overlapping portions fastened to each other by adhesion, sewing or the like to form tab 30 to aid grasping and manuel manipulation of the strap for release from the outer face of fabric fastener 20 carried by the body.

The fastened end portion 23 of the strap preferably is permanently fastened to the underlying end portion of body 13 by mechanical means in addition to the releasable fastening caused by the adjacent fabric fastener elements carried by the body and strap. This mechanical fastening in the instance illustrated is accomplished by adhesion, sewing 32 and mechanical fastening by fasteners 19a passing through both elements. The portion of the strap so fastened is preferably not more than approximately one-sixth of the strap length so that a substantial area of the strap outwardly of the body of a theft prevention device may be fastened to the body of the holder to provide a secure joinder.

Strap 22 is preferably formed of a woven fiber strapping or belting material to provide appropriate strength and durability for the member. Portion 31 of the strap immediately outwardly from the fastened end portion 23 is configured to fit about the body of a theft prevention device to be carried in the holder. This configuration may be established and maintained by use of various fabric stiffening materials heretofore known, such as starches, adhesives and polymeric materials. If the strap be formed of a polymeric or resinous fiber that is thermally or solvent sensitive, such material may be configured by changing the fiber thermally or chemically as heretofore known to provide sufficient retentent memory in the fiber to maintain its configuration but yet maintain sufficient flexibility to allow deformation to accept antitheft device bodies of varying sizes and configurations.

For more secure fastening of the body of an antitheft device in my holders, body fastening bands 36 optionally may be fastened about the peripheral surface of the body of the device. The fastening bands 36 preferably have a width substantially the same as holder fastening band 11 and a length to encircle the antitheft device body. The bands 36 are positioned on the antitheft device body at spaced positions where the fastening straps 22 extend thereover and provide an outer surface formed by at least one element of a hook and loop fabric fastener that will fastenably engage with at least one of the hook and loop fasteners of a holder.

Preferably the bands 36 are formed by two adjacent strips of fastening material, one of the hook type 36a and the other of the loop type 36b so that the band 36 may fasten to both of the hook and loop fastening elements carried by the holder.

Having described the structure of my holders, their use with antitheft prevention devices may be understood.

The typical antitheft prevention device 12 which my holders are designed to positionally maintain is illustrated in dashed outline in FIG. 1. Most such devices provide the same essential configuration, with an elongate body 33 structurally carrying L-shaped, radially extending hooks 34 spacedly inwardly from each end. The medial portion of body 33 carries locking and adjusting mechanism 35 which allows the antitheft device to be irremovably positioned on and removed from the steering wheel of an automotive vehicle.

To use my holding system, two holders are created according to the foregoing specification. The holders are established in spaced adjacency on the inner surface of an automotive vehicle (not shown) by headed screw-type fasteners 19 that extend through base 10 and into fastenable engagement with the automotive body therebeneath. The bases of the two holders are positioned at a distance such that each holder will be spacedly outwardly of each hook 34 of a theft prevention device to be held so that the end portions of the body of that device will extend at least over a portion of the base. The holders must also be installed in a position on a vehicle surface where no obstructions prevents the body of the antitheft device from extending between the two holders or interferes with any other portions of the theft prevention device when carried by the two holders.

For use then, strap 22 of each holder is grasped by tab 30 and manually moved to release it from fastenable engagement with the underlying body 13 to the point of permanent fastening of end 23 on the holder body. The body of the antitheft device then is positioned over the bases of the two holders substantially as illustrated in FIG. 1, with each end portion of the antitheft device body extending over the fastenable portion of the strap adjacent the fastened end 23. The antitheft device is maintained in this position by a user while one of the fastening straps 22 is moved over the body of the antitheft device and the portion of the strap extending away from fastened end 23 is tightened and refastened to base 10 on the other side of the body with pre-configured portion 31 extending over the body. The same operation is carried out with the other holder and the antitheft device then is releasably fastened between the two holders to be there positionally maintained until manually released by manipulation of straps 22 in the reverse fashion of that described.

It is to be noted that the holder may be positioned on most inner surfaces of a vehicle, but commonly it is more convenient if it is positioned on the floor of a vehicle immediately forwardly or rearwardly of the front seat in a two-seated vehicle, on a shelf forwardly of the rear window or on the inner surface of the floor or top of the automobile trunk.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desired to protect by Letters Patent, and

What I claim is:

1. A fastening system to releasably positionally maintain an auto antitheft device having an elongate body on an interior surface of a vehicle during periods of non-use, the auto antitheft device having a first end and a second end with a fastening means integral with at least one of the ends of the auto antitheft device, the fastening system including two spaced adjacent holders, each holder comprising in combination:

an elongate base having inner and outer surfaces with first means to fastenably maintain the inner surface of the base on the interior surface of the vehicle, second means at one end portion to permanently fasten an elongate flexible fastening band thereto and third means on the outer surface to releasably fasten the elongate flexible fastening band to a portion of the outer surface; and the elongate flexible fastening band being permanently fastened to the end portion of the base, having a pre-formed, configurationally sustaining, flexibly deformable portion adjacent the area permanently fastened to the body to conformably receive and fit over a portion of the body of the antitheft device to be carried by the fastening system extending over the base and having fastening means on its surface adjacent the base to releasably fasten with the releasable fastening means of the base, the flexibly deformable portion having a fastening means adapted to engage the fastening means that is integral with the at least one of the ends of the auto antitheft device.

2. The fastening system of claim 1 wherein the releasable fastening means carried by adjacent surfaces of the base and the fastening band comprise mating elements of a hook and loop type fabric fastener.

3. The fastening system of claim 1 wherein the elongate base is formed of deformable material to conformably fit on the vehicular surface carrying the elongate base.

4. A fastening system to releasably positionally maintain an antitheft device, having an elongate body with fastening hooks extending radially outwardly spacedly inward from each end, on an interior surface of an automotive vehicle during periods of non-use of the antitheft device, the auto antitheft device having a first end and a second end with a hook and loop fastener means integral with at least one of the ends of the auto antitheft device, the fastening system comprising in combination:

two spaced adjacent holders, each having an elongate base having inner and outer surfaces with first means for fastening the inner surface of the base on the interior surface of the vehicle, second means for permanently fastening an elongate flexible fastening band to the outer surface of the base, and a hook and loop fabric fastening element on the portion of the outer surface of the base not permanently fastening the elongate flexible fastening band on the outer surface of the base for releasably fastening the elongate flexible fastening band to the base;

the elongate flexible fastening band having a first end portion permanently fastened to the end portion of the base to extend over the base, said elongate flexible fastening band having a end second portion extending beyond the base, a hook and loop fastening element on its surface adjacent the base to releasably fasten with the hook and loop fastening element on the outer surface of the base, and a pre-formed, configurationally sustaining but flexibly deformable portion adjacent the area permanently fastened to the base to conformably receive and fit over a portion of the body of an antitheft device to be carried by the holder the flexibly deformable portion having a hook and loop type fastening means adapted to engage the hook and loop type fastening means that is integral with the at least one of the ends of the auto antitheft device.

* * * * *